United States Patent
Xu et al.

(10) Patent No.: US 9,874,793 B2
(45) Date of Patent: Jan. 23, 2018

(54) NARROW FRAME LIQUID CRYSTAL DISPLAY AND METHOD FOR PRODUCING THE SAME, LARGE SCREEN LIQUID CRYSTAL DISPLAY APPARATUS

(71) Applicant: BOE Technology Group Co., Ltd., Beijing (CN)

(72) Inventors: Chao Xu, Beijing (CN); Wei Qin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 347 days.

(21) Appl. No.: 14/191,917

(22) Filed: Feb. 27, 2014

(65) Prior Publication Data
US 2014/0354915 A1  Dec. 4, 2014

(30) Foreign Application Priority Data

May 31, 2013 (CN) ................... 2013 2 0312908 U (51) Int. Cl.
*G02F 1/1345* (2006.01)

(52) U.S. Cl.
CPC ..... *G02F 1/13452* (2013.01); *Y10T 29/49126* (2015.01)

(58) Field of Classification Search
CPC ............ G02F 1/13452; G02F 1/13454; Y10T 29/49126; G09G 2300/0426
USPC ................................................. 349/149–152
See application file for complete search history.

(56) References Cited

U.S. PATENT DOCUMENTS

| | | | | |
|---|---|---|---|---|
| 5,841,501 A * | 11/1998 | Eiraku | ................ | G02F 1/13452 349/149 |
| 6,266,119 B1 * | 7/2001 | Takahashi | ........... | G02F 1/13452 349/149 |
| 6,819,376 B1 * | 11/2004 | Muramatsu | ......... | G02F 1/13452 349/110 |
| 7,095,476 B2 * | 8/2006 | Lo | ....................... | G02F 1/13452 349/150 |
| 7,518,691 B2 * | 4/2009 | Kobayashi | .......... | G02F 1/13452 349/149 |

(Continued)

*Primary Examiner* — Edward Glick
*Assistant Examiner* — David Chung
(74) *Attorney, Agent, or Firm* — Westman, Champlin & Koehler, P.A.

(57) ABSTRACT

A narrow frame liquid crystal display, comprising: an array substrate comprising a first mounting area and a second mounting area; a color film substrate mounted on the first mounting area; a first chip bonded onto the second mounting area of the array substrate; a first flexible circuit board bonded onto the second mounting area of the array substrate; a first lead configured to electrically connect the first chip and the first flexible circuit board; and a second lead configured to electrically connect a display region of the array substrate and the first chip. The first chip, the first lead and the first flexible circuit board are sequentially arranged on the second mounting area in a first direction away from the color film substrate. A distance between the first chip and the first flexible circuit board is set to be less than 10 mm. The size of the area for mounting the chip can be reduced, and the frame of the liquid crystal display can become narrower. The present invention further provides a method of producing narrow frame liquid crystal displays.

18 Claims, 4 Drawing Sheets

(56) References Cited

U.S. PATENT DOCUMENTS

| | | | |
|---|---|---|---|
| 7,940,366 B2 * | 5/2011 | Watanabe | G02F 1/133305 349/150 |
| 2006/0001820 A1 * | 1/2006 | Cheng | G02F 1/13452 349/150 |
| 2006/0044505 A1 * | 3/2006 | Nakazawa | G02F 1/13452 349/150 |
| 2013/0027321 A1 * | 1/2013 | Chen | G06F 3/04883 345/173 |

* cited by examiner

NARROW FRAME LIQUID CRYSTAL DISPLAY AND METHOD FOR PRODUCING THE SAME, LARGE SCREEN LIQUID CRYSTAL DISPLAY APPARATUS

CROSS-REFERENCE TO RELATED APPLICATION

This application claims the benefit of Chinese Patent Application No. 201320312908.7 filed on May 31, 2013 in the State Intellectual Property Office of China, the whole disclosure of which is incorporated herein by reference.

BACKGROUND OF THE INVENTION

Field of the Invention

The present invention relates to a liquid crystal display, more particularly, relates to a narrow frame liquid crystal display and a method for producing the narrow frame liquid crystal display as well as a large screen liquid crystal display apparatus combined by the narrow frame liquid crystal displays.

Description of the Related Art

Figure 1:
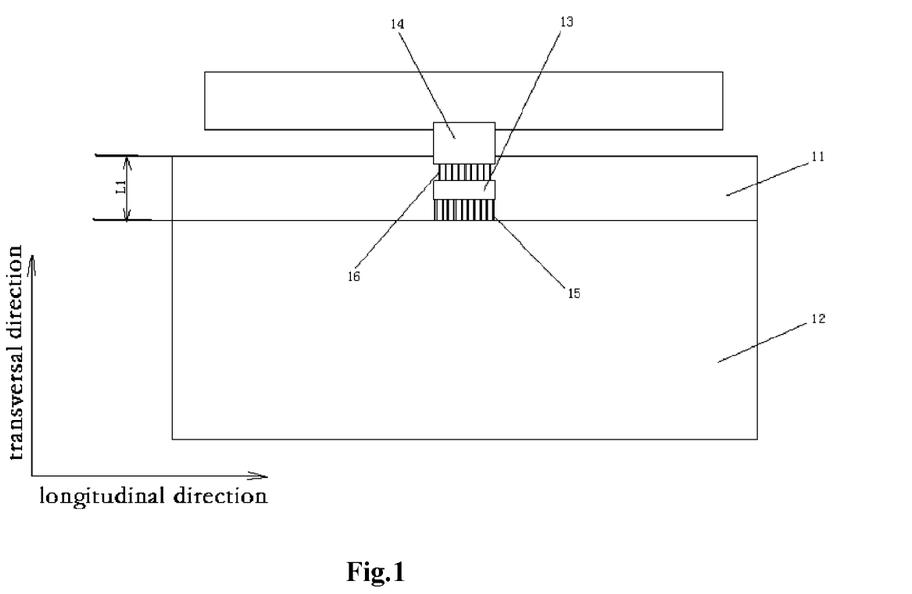
FIG. 1 is an illustrative plan view of a wide frame liquid crystal display in the prior art.

As shown in FIG. 1, in the prior art, in producing a liquid crystal display, firstly, it is necessary to bond a color film substrate 12 to an array substrate 11. A lead 15 on the array substrate 11 has a first end bonded between the color film substrate 12 and the array substrate 11 and a second end led out to connect a chip 13 on glass (COG), for example, used as the array substrate 11. Then, a step of bonding the chip 13 to the array substrate 11 and that of bonding a flexible printed circuit board (FPCB) or a flexible circuit board (FCB) or a flexible printed circuit (FPC) are performed. The step of bonding the chip 13 is performed prior to the step of bonding the flexible printed circuit board. The step of bonding of the chip 13 and that of the flexible circuit board are accomplished by press-fitting by means of a press-fit tool.

Figure 2:
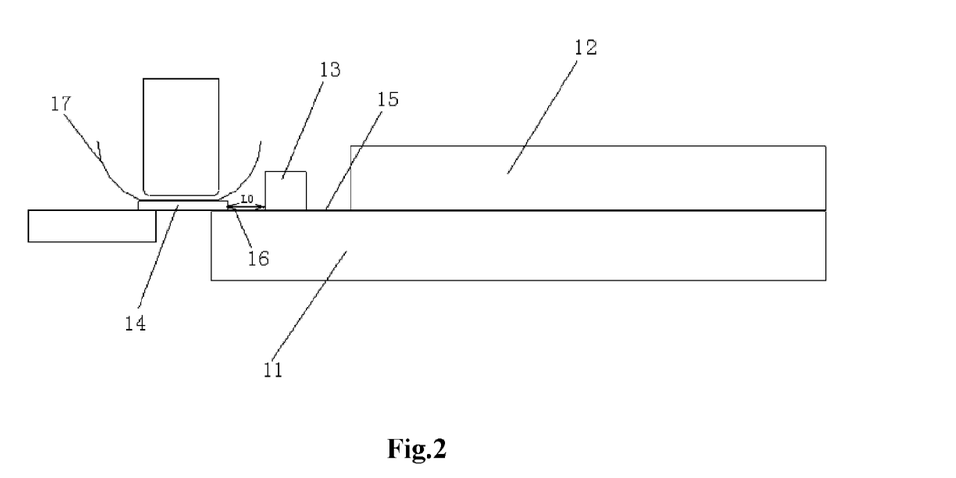
FIG. 2 is an illustrative side view of the wide frame liquid crystal display of FIG. 1.

On a mounting area at a side of the array substrate in a longitudinal direction, the flexible circuit board 14 is connected to the chip 13 through the lead 16. The lead 16 may be pre-arranged on the array substrate 11, then the flexible circuit board 14 and the chip 13 may be bonded to both ends of the lead 16. As shown in FIG. 2, the press-fit tool has a curved press-fitting structure 17. The chip 13 bonded to the array substrate 11 is thicker than the flexible circuit board 14. During bonding the flexible circuit board 14, in order to prevent the chip 13 bonded on the array substrate 11 from being crushed by the edge of the curved press-fitting structure 17, it is necessary to leave a certain distance L0 (generally larger than 10 mm) between the flexible circuit board 14 and the chip 13 in a transversal direction. As a result, it needs to increase the mounting area on the array substrate for providing the chip 13 and the flexible circuit board 14, widening the frame L1 of the liquid crystal display.

SUMMARY OF THE INVENTION

The present invention has been made to overcome or alleviate at least one aspect of the above mentioned disadvantages.

Accordingly, it is an object of the present invention to provide a narrow frame liquid crystal display and a large screen liquid crystal display apparatus combined by the narrow frame liquid crystal displays.

According to an aspect of the present invention, there is provided a narrow frame liquid crystal display, comprising:
an array substrate comprising a first mounting area and a second mounting area;
a color film substrate mounted on the first mounting area;
a first chip bonded onto the second mounting area of the array substrate;
a first flexible circuit board bonded onto the second mounting area of the array substrate;
a first lead configured to electrically connect the first chip and the first flexible circuit board; and
a second lead configured to electrically connect a display region of the array substrate and the first chip,
wherein the first chip, the first lead and the first flexible circuit board are sequentially arranged on the second mounting area in a first direction away from the color film substrate, and
wherein a distance between the first chip and the first flexible circuit board is set to be less than 10 mm.

According to another aspect of the present invention, there is provided a large screen liquid crystal display apparatus combined by a plurality of narrow frame liquid crystal displays according to the above embodiment.

According to another aspect of the present invention, there is provided a method for producing a narrow frame liquid crystal display, comprising steps of:
forming a first mounting area and a second mounting area on an array substrate;
mounting a color film substrate on the first mounting area;
arranging a first lead on the second mounting area;
bonding a first flexible circuit board onto the second mounting area of the array substrate, so that the first flexible circuit board is bonded to a first end of the first lead; and
bonding a first chip onto the second mounting area of the array substrate, so that the first chip is bonded to a second end of the first lead,
wherein the first chip, the first lead and the first flexible circuit board are sequentially arranged on the second mounting area in a first direction away from the color film substrate, and
wherein a distance between the first chip and the first flexible circuit board is set to be less than 10 mm.

In the narrow frame liquid crystal display according to the above embodiment of the present invention, since the distance between the chip and the flexible circuit board is set to be less than 10 mm, the size of the area for mounting the chip can be reduced, and the frame of the liquid crystal display can become narrower, improving the overall visual effect of the large screen liquid crystal display apparatus combined by a plurality of narrow frame liquid crystal displays.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present invention, there is provided a narrow frame liquid crystal display, comprising: an array substrate comprising a first mounting area and a second mounting area; a color film substrate mounted on the first mounting area; a first chip bonded onto the second mounting area of the array substrate; a first flexible circuit board bonded onto the second mounting area of the array substrate; a first lead configured to electrically connect the first chip and the first flexible circuit board; and a second lead configured to electrically connect a display region of the array substrate and the first chip. The first chip, the first lead and the first flexible circuit board are sequentially arranged on the second mounting area in a first direction away from the color film substrate. A distance between the first chip and the first flexible circuit board is set to be less than 10 mm.

First Embodiment

Figure 3:
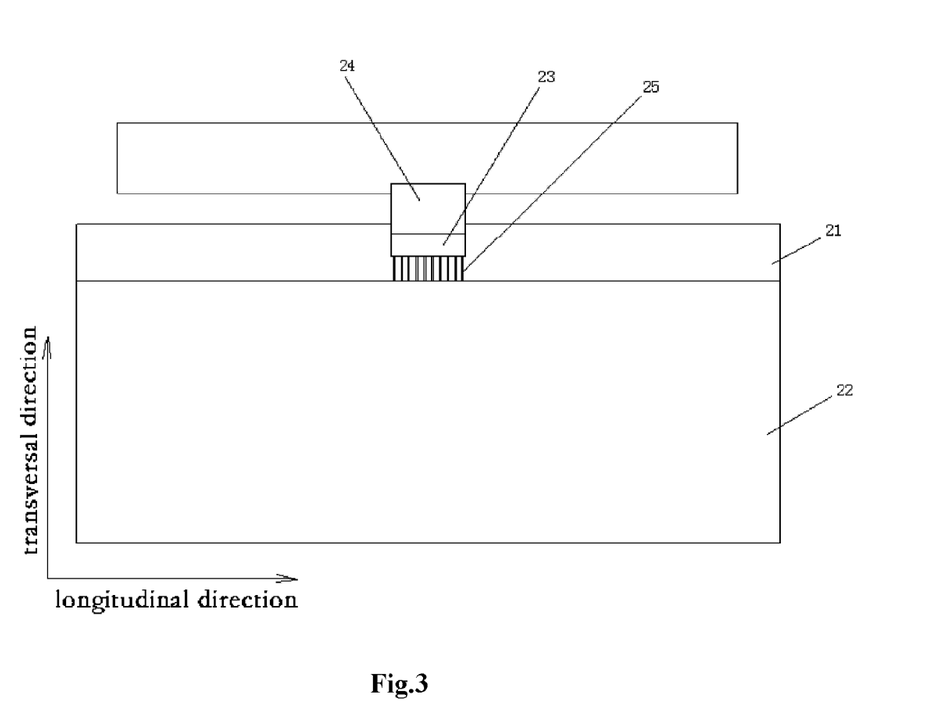
FIG. 3 is an illustrative plan view of a narrow frame liquid crystal display according to a first exemplary embodiment of the present invention.
Figure 4:
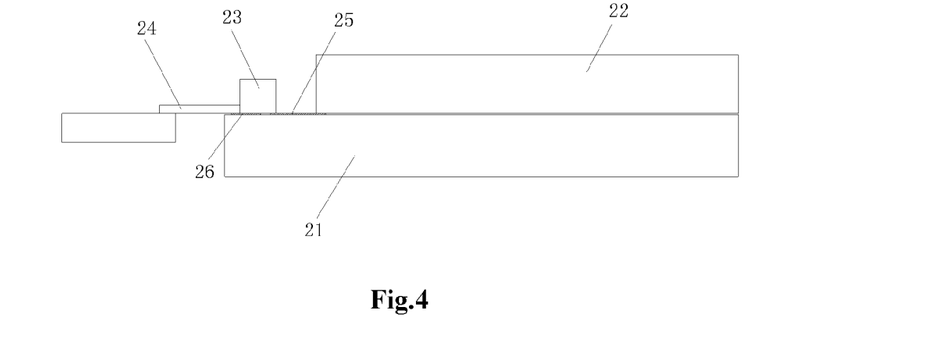
FIG. 4 is an illustrative side view of the narrow frame liquid crystal display of FIG. 3.

FIG. 3 is an illustrative flat view of a narrow frame liquid crystal display according to a first exemplary embodiment of the present invention; and FIG. 4 is an illustrative side view of the narrow frame liquid crystal display of FIG. 3.

As shown in FIGS. 3 and 4, the narrow frame liquid crystal display mainly comprises an array substrate 21 made of, for example, glass, a color film substrate 22, a chip 23, such as a chip on glass (COG), a first lead 26, a second lead 25 and a flexible circuit board 24, such as a flexible printed circuit board (FPCB). A surface of the array substrate 21 on which a thin film transistor array for driving pixels of a display region is provided is divided into a first mounting area corresponding to the color film substrate 22 and a second mounting area. The size of the first mounting area corresponds to the size of the color film substrate 22, and the second mounting area is constituted by the rest area of the array substrate 21 except the first mounting area. A second lead 25 is configured to electrically connect the display region of the array substrate 21 and the first chip 23. In this embodiment, the second mounting area is located at an edge of said a surface of the array substrate 21 extending in a longitudinal direction (a left-right direction in FIG. 3). The chip 23, the first lead 26 and the flexible circuit board 24 are sequentially arranged on the second mounting area in a transversal direction away from the color film substrate 22. The first lead 26 is configured to electrically connect the chip 23 and the flexible circuit board 24. A distance between the chip 23 and the flexible circuit board 24 in the transversal direction of the surface of the array substrate 21 is set to be less than 10 mm.

In the prior art, a distance between a chip and a flexible circuit board in a transversal direction of a surface of an array substrate is generally set to be larger than 10 mm. Accordingly, compared with the narrow frame liquid crystal display in the prior art as shown in FIGS. 1-2, this embodiment of the present invention reduces the distance between the chip 23 and the flexible circuit board 24. Correspondingly, a width of the second mounting area for mounting the chip 23 in the transversal direction of the surface of the array substrate 21 is reduced, achieving the narrow frame liquid crystal display.

In producing the liquid crystal display according to the first exemplary embodiment, the flexible circuit board 24 is bonded onto the second mounting area, for example, in a manner of press-fitting, prior to the chip 23, for example, in a manner of press-fitting, so that the distance between the flexible circuit board 24 and the chip 23 can be set small, for example, less than 10 mm, or even equal to zero. In this way, the size of the second mounting area can be reduced, decreasing the width of the frame of the liquid crystal display, and avoiding the damage of the chip 23 during bonding the flexible circuit board 24.

The flexible circuit board 24 is connected to the chip 23 through the first lead 26 arranged in the transversal direction of the surface of the array substrate 21. In an exemplary embodiment, the flexible circuit board 24 is bonded to a first end (a left end in FIG. 4) of the first lead 26, the chip 23 is bonded to a second end (a right end in FIG. 4) of the first lead 26. The first lead 26 may be pre-provided on the array substrate 21, or the first end of the first lead 26 may be directly connected to the flexible circuit board 24.

A step of bonding the chip 23 to the first lead 26 comprising: bonding, for example, in a manner of press-fitting, a first side of the chip 23 to a side of the flexible circuit board 24 connected to the first lead 26, and bonding an entire side of the first lead 26 connected to the flexible circuit board 24 to a bottom of the chip 23, that is, the first chip 23 is bonded to a second end of the first lead 26, so that the chip 23 is electrically connected to the first flexible circuit board 24. In this embodiment, since the chip 23 is directly bonded to the flexible circuit board 24, the distance between the chip 23 and the flexible circuit board 24 becomes zero, and the side of the first lead 26 connected to the flexible circuit board 24 is fully bonded to the bottom of the chip 23. As a result, the electrical connection of the chip 23 to the flexible circuit board 24 becomes more reliable, effectively avoiding the poor contact between the chip 23 and the flexible circuit board 24 with further reducing the width of the second mounting area on the surface of the array substrate 21 in the transversal direction.

In order to press-fit all leads of the flexible circuit board 24 during bonding the chip 23, a length of the flexible circuit board 24 in the longitudinal direction of the surface of the array substrate 21 is set to be equal to or less than a length of the chip 23 in the longitudinal direction of the surface of the array substrate 21.

The chip 23 is further connected to the display region of the array substrate 21 and the color film substrate 22 in addition to the flexible circuit board 24. The second lead 25 is arranged on the array substrate 21 in the transversal direction of the surface of the array substrate 21. An end of the second lead 25 is electrically connected to the display region of the array substrate. A second side of the chip 23 opposite to the first side is bonded to the other end of the second lead 25. In an embodiment, the first lead 26 and the second lead 25 each comprises a plurality of wires.

Hereafter, it will describe in detail a method for producing the narrow frame liquid crystal display according to the first embodiment. The method comprising steps of: forming a first mounting area on an array substrate 21 and a second mounting area at an edge of a surface of the array substrate 41 extending in the longitudinal direction; mounting a color film substrate 22 on the first mounting area; arranging a first lead 26 on the second mounting area; bonding a flexible circuit board 24 onto the second mounting area of the array substrate 21, for example, in a manner of press-fitting, so that the flexible circuit board 24 is bonded to a first end of the first lead 26; and bonding a first side of a chip 23 onto the second mounting area of the array substrate 21, for example, in a manner of press-fitting, so that the chip 23 is bonded to a second end of the first lead 26. The chip 23, the first lead 26 and the flexible circuit board 24 are sequentially arranged on the second mounting area in the transversal direction away from the color film substrate 22. The distance between the first chip 23 and the first flexible circuit board 24 is set to be less than 10 mm.

In the above method for producing the narrow frame liquid crystal display, an end of a second lead 25 extending in the transversal direction is electrically connected to a display region of the array substrate 21 during the step of mounting the color film substrate 22 on the first mounting area; and a second side of the first chip 23 opposite to the first side is bonded to the other end of the second lead 25 during the step of bonding the first side of the first chip 23 onto the second mounting area of the array substrate 21.

In another embodiment, in the above method for producing the narrow frame liquid crystal display, the first side of the first chip 23 is bonded to a side of the first flexible circuit board 24 connected to the first end of the first lead 26 during the step of bonding the first side of the first chip 23 onto the second mounting area of the array substrate 21. With such arrangement, the distance between the chip 23 and the flexible circuit board 24 becomes zero, and the first side of the first lead 26 connected to the flexible circuit board 24 is fully bonded to the bottom of the chip 23. As a result, the electrical connection of the chip 23 to the flexible circuit board 24 becomes more reliable, effectively avoiding the poor contact between the chip 23 and the flexible circuit board 24 with further reducing the width of the second mounting area on the surface of the array substrate 21 in the transversal direction.

Second Embodiment

Figure 5:
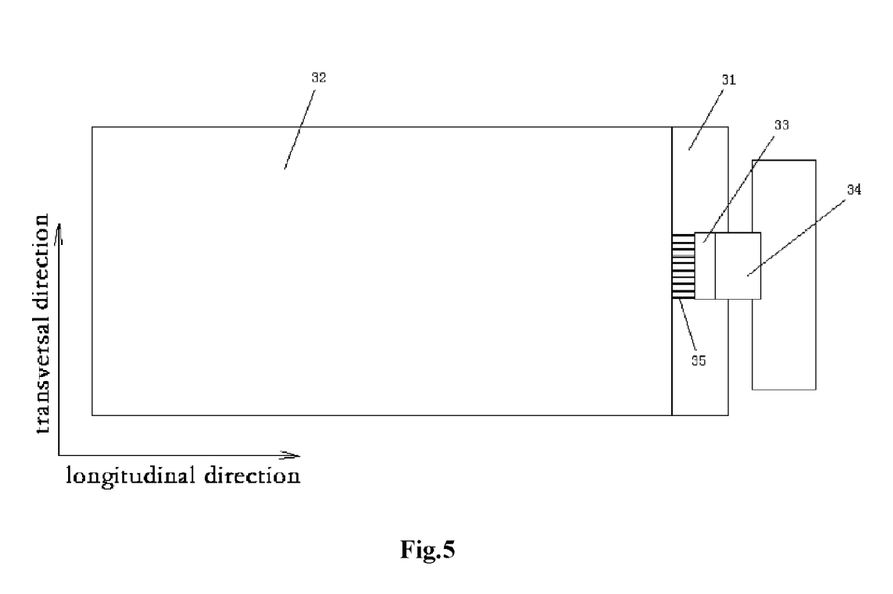
FIG. 5 is an illustrative plan view of a narrow frame liquid crystal display according to a second exemplary embodiment of the present invention.
Figure 6:
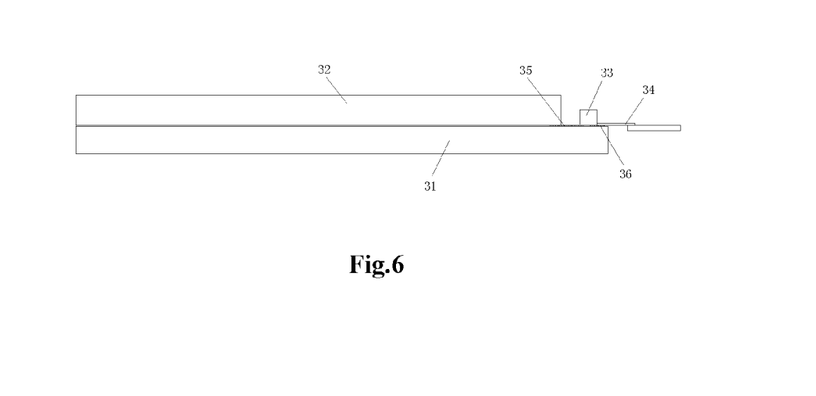
FIG. 6 is an illustrative side view of the narrow frame liquid crystal display of FIG. 5.

FIG. 5 is an illustrative plan view of a narrow frame liquid crystal display according to a second exemplary embodiment of the present invention; and FIG. 6 is an illustrative side view of the narrow frame liquid crystal display of FIG. 5.

As shown in FIGS. 5-6, the narrow frame liquid crystal display according to the second exemplary embodiment of the present invention comprises an array substrate 31, a color film substrate 32, a chip 33, such as a chip on glass (COG), a first lead 36, a second lead 35 and a flexible circuit board 34, such as a flexible printed circuit board (FPCB). A surface of the array substrate 31 on which a thin film transistor array for driving pixels of a display region is provided is divided into a first mounting area corresponding to the color film substrate 32 and a second mounting area. The size of the first mounting area corresponds to the size of the color film substrate 32, and the second mounting area is constituted by the rest area of the array substrate 31 except the first mounting area. A second lead 35 is configured to electrically connect a display region of the array substrate 31 and the first chip 33.

The main difference of the narrow frame liquid crystal display of the second embodiment from the narrow frame liquid crystal display of the first embodiment is that the second mounting area is located at an edge of the surface of the array substrate 31 extending in a transversal direction. The chip 33, the first lead 36 and the flexible circuit board 34 are successively arranged on the second mounting area of the surface of the array substrate 31 in a longitudinal direction away from the color film substrate 32. The first lead 36 is configured to electrically connect the chip 33 and the flexible circuit board 34. A distance between the chip 33 and the flexible circuit board 34 in the longitudinal direction of the surface of the array substrate 31 is set to be less than 10 mm.

In the prior art, a distance between a chip and a flexible circuit board in a longitudinal direction of a surface of an array substrate generally is set to be larger than 10 mm. Accordingly, compared with the prior art, this embodiment of the present invention reduces the distance between the chip 33 and the flexible circuit board 34. Correspondingly, a length of the second mounting area for mounting the chip 33 in the longitudinal direction of the surface of the array substrate 31 is reduced, achieving the short frame liquid crystal display.

In producing the liquid crystal display according to the second exemplary embodiment, the flexible circuit board 34 is bonded onto the second mounting area, for example, in a manner of press-fitting, prior to the chip 33, so that the distance between the flexible circuit board 34 and the chip 33 can be set small, for example, less than 10 mm, or even equal to zero. In this way, the size of the second mounting area can be reduced, decreasing the length of the frame of the liquid crystal display, and avoiding the damage of the chip 33 during bonding the flexible circuit board 34.

The flexible circuit board 34 is connected to the chip 33 through the first lead 36 arranged in the longitudinal direction of the surface of the array substrate 31. In an exemplary embodiment, the flexible circuit board 34 is bonded to a first end (a right end in FIG. 6) of the first lead 36, the chip 33 is bonded to a second end (a left end in FIG. 6) of the first lead 36. The first lead 36 may be pre-arranged on the array substrate 31, or the first end of the first lead 36 may be directly connected to the flexible circuit board 34.

A step of bonding the chip 33 to the first lead 36 comprising: bonding, for example, in a manner of press-fitting, a first side of the chip 33 to a side of the flexible circuit board 34 connected to the first lead 36, and bonding an entire side of the first lead 36 connected to the flexible circuit board 34 to a bottom of the chip 33, that is, the first chip is bonded to a second end of the first lead, so that the chip 33 is connected to the first flexible circuit board 34. In this embodiment, since the chip 33 is directly bonded to the flexible circuit board 34, the distance between the chip 33 and the flexible circuit board 34 becomes zero, and the side of the first lead 36 connected to the flexible circuit board 34 is fully bonded to the bottom of the chip 33. As a result, the electrical connection of the chip 33 to the flexible circuit board 34 becomes more reliable, effectively avoiding the poor contact between the chip 33 and the flexible circuit board 34 with further reducing the length of the second mounting area on the surface of the array substrate 31 in the longitudinal direction.

In order to press-fit all leads of the flexible circuit board 34 during bonding the chip 33, a length of the flexible circuit board 34 in the transversal direction of the surface of the array substrate 31 is set to be equal to or less than a length of the chip 33 in the transversal direction of the surface of the array substrate 31.

The chip 33 is further connected to the display region of the array substrate 31 and the color film substrate 32 in addition to the flexible circuit board 34. The second lead 35 is arranged on the array substrate 31 in the longitudinal direction of the surface of the array substrate 31. An end of the second lead 35 is electrically connected to the display region of the array substrate 31. The other side of the chip 33 is bonded to the other end of the second lead 35. In an embodiment, the first lead 36 and the second lead 35 each comprises a plurality of wires.

A method for producing the narrow frame liquid crystal display of the second embodiment is similar to the method for producing the narrow frame liquid crystal display of the first embodiment. Thereby, the description thereof it is omitted herein.

Third Embodiment

Figure 7:
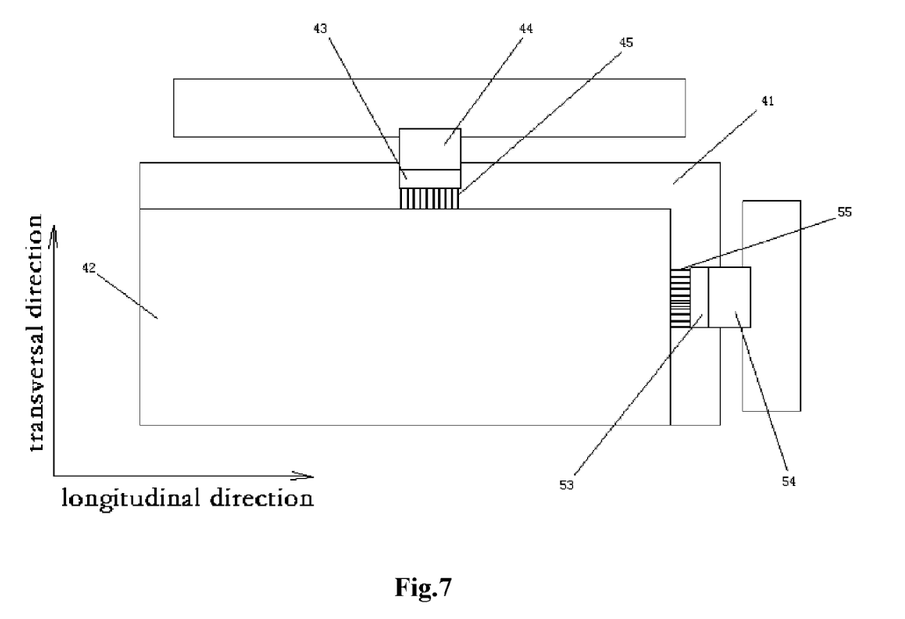
FIG. 7 is an illustrative plan view of a narrow frame liquid crystal display according to a third exemplary embodiment of the present invention.
Figure 8:
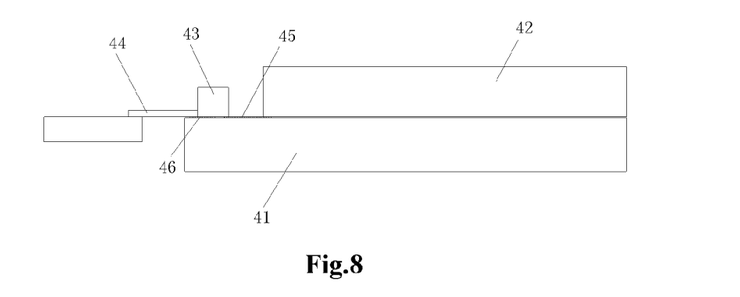
FIG. 8 is an illustrative side view of the narrow frame liquid crystal display of FIG. 7 in a longitudinal direction.

FIG. 7 is an illustrative plan view of a narrow frame liquid crystal display according to a third exemplary embodiment of the present invention; FIG. 8 is an illustrative side view of the narrow frame liquid crystal display of FIG. 7 in a longitudinal direction; and FIG. 9 is an illustrative side view of the narrow frame liquid crystal display of FIG. 7 in a transversal direction.

Figure 9:
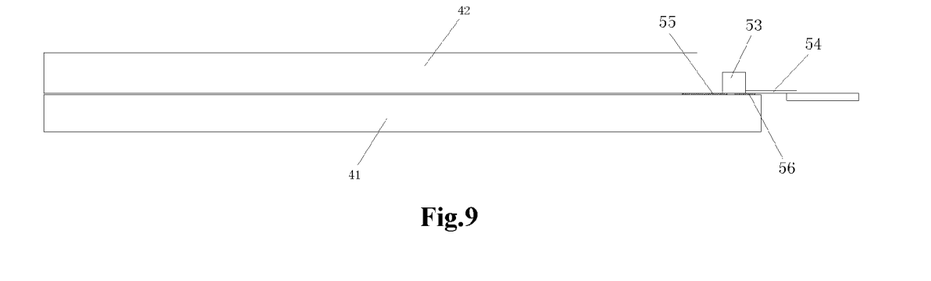
FIG. 9 is an illustrative side view of the narrow frame liquid crystal display of FIG. 7 in a transversal direction.

As shown in FIGS. 7-9, a surface of an array substrate 41 on which a thin film transistor array for driving pixels of a display region is provided is divided into a first mounting area corresponding to a color film substrate 42 in size, a second mounting area at an edge of the surface of the array substrate 41 extending in a longitudinal direction (a second direction), and a third mounting area at an edge of the surface of the array substrate 41 extending in a transversal direction (a first direction). A first chip 43, such as a chip on glass (COG), a first lead 46 and a first flexible circuit board 44, such as a flexible printed circuit board (FPCB) are sequentially arranged on the second mounting area of the surface of the array substrate in the transversal direction away from a color film substrate 42. A second lead 45 is configured to electrically connect the display region of the array substrate 41 and the first chip 43. A second chip 53, such as a chip on glass (COG), a third lead 56 and a second flexible circuit board 54, such as a flexible printed circuit board (FPCB) are sequentially arranged on the third mounting area of the surface of the array substrate 41 in the longitudinal direction away from a color film substrate 42. A fourth lead 55 is configured to electrically connect the display region of the array substrate 41 and the second chip 53.

A distance between the first chip 43 and the first flexible circuit board 44 in the transversal direction of the surface of the array substrate 41 is set to be less than 10 mm. A distance between the second chip 53 and the second flexible circuit board 54 in the longitudinal direction of the surface of the array substrate 41 also is set to be less than 10 mm.

In the prior art, a distance between a chip and a flexible circuit board in a transversal direction or a longitudinal direction of a surface of an array substrate generally is set to be larger than 10 mm. Accordingly, compared with the prior art, this embodiment of the present invention reduces the distance between the first chip 43 and the first flexible circuit board 44 as well as the distance between the second chip 53 and the second flexible circuit board 54, achieving the narrow frame liquid crystal display having a decreased size.

In producing the liquid crystal display according to the third exemplary embodiment, the first flexible circuit board 44 is bonded onto the second mounting area, for example, in a manner of press-fitting, prior to the first chip 43, and the second flexible circuit board 54 is bonded onto the third mounting area prior to the second chip 53, so that the distance between the first flexible circuit board 44 and the first chip 43 as well as the distance between the second flexible circuit board 54 and the second chip 53 both can be reduced. In this way, the size of the second mounting area and the third mounting area both can be reduced, decreasing the size of the frame of the liquid crystal display, and avoiding the damage of the first chip 43 and the second chip 53 during bonding the first and second flexible circuit boards 44, 54.

The first flexible circuit board 44 is connected to the first chip 43 through the first lead 46 arranged in the transversal direction of the surface of the array substrate 41. In an exemplary embodiment, the first flexible circuit board 44 is bonded to a first end (a left end in FIG. 8) of the first lead 46, the first chip 43 is bonded to a second end (a right end in FIG. 8) of the first lead 46. The first lead 46 may be pre-arranged on the array substrate 41, or the first end of the first lead 46 may be directly connected to the second flexible circuit board 44.

The second flexible circuit board 54 is connected to the second chip 53 through the third lead 56 arranged in the longitudinal direction of the surface of the array substrate 41. In an exemplary embodiment, the second flexible circuit board 54 is bonded to a second end (a right end in FIG. 9) of the third lead 56, the second chip 53 is bonded to a second end (a left end in FIG. 9) of the third lead 56. The third lead 56 may be pre-arranged on the array substrate 41, or the first end of the third lead 56 may be directly connected to the second flexible circuit board 54.

A step of bonding the first chip 43 to the first lead 46 comprising: bonding, for example, in a manner of press-fitting, a first side of the first chip 43 to a side of the first flexible circuit board 44 connected to the first lead 46, and bonding an entire side of the first lead 46 connected to the first flexible circuit board 44 to a bottom of the first chip 43, that is, the first chip is bonded to a second end of the first lead, so that the first chip 43 is electrically connected to the first flexible circuit board 44. In this embodiment, since the first chip 43 is directly bonded to the first flexible circuit board 44, the distance between the first chip 43 and the first flexible circuit board 44 becomes zero, and the side of the first lead 46 connected to the first flexible circuit board 44 is fully bonded to the bottom of the first chip 43. As a result, the electrical connection of the first chip 43 to the first flexible circuit board 44 becomes more reliable, effectively avoiding the poor contact between the first chip 43 and the first flexible circuit board 44 with further reducing the width of the second mounting area on the surface of the array substrate 41 in the transversal direction.

Similarly, a step of bonding the second chip 53 to the third lead 56 comprising: bonding, for example, in a manner of press-fitting, a first side of the second chip 53 to a side of the second flexible circuit board 54 connected to the third lead 56, and bonding an entire side of the third lead 56 connected to the second flexible circuit board 54 to a bottom of the second chip 53, so that the second chip 53 is connected to the second flexible circuit board 54. In this embodiment, since the second chip 53 is directly bonded to the second flexible circuit board 54, the distance between the second chip 53 and the second flexible circuit board 54 becomes zero, and the side of the third lead 56 connected to the second flexible circuit board 54 is fully bonded to the bottom of the second chip 53. As a result, the electrical connection of the second chip 53 to the second flexible circuit board 54 becomes more reliable, effectively avoiding the poor contact between the second chip 53 and the second flexible circuit board 54 with further reducing the length of the third mounting area on the surface of the array substrate 41 in the longitudinal direction.

In order to press-fit all leads of the first flexible circuit board 44 during bonding the first chip 43, a length of the first flexible circuit board 44 in the longitudinal direction of the surface of the array substrate 41 is set to be equal to or less than a length of the first chip 43 in the longitudinal direction of the surface of the array substrate 41. Similarly, in order to press-fit all leads of the second flexible circuit board 54 during bonding the second chip 53, a length of the second flexible circuit board 54 in the transversal direction of the surface of the array substrate 41 is set to be equal to or less than a length of the second chip 53 in the transversal direction of the surface of the array substrate 41.

The first chip 43 is further connected to the array substrate 41 and the color film substrate 42 in addition to the first flexible circuit board 44. The second lead 45 is arranged on the array substrate 41 in the transversal direction of the surface of the array substrate 41. An end of the second lead 45 is electrically connected to the display region of the array substrate 41. The other side of the first chip 43 is bonded to the other end of the second lead 45. Similarly, the second chip 53 is further connected to the array substrate 41 and the color film substrate 42 in addition to the second flexible circuit board 54. The fourth lead 55 is arranged on the array substrate 41 in the longitudinal direction of the surface of the array substrate 41. An end of the fourth lead 55 is electrically connected to the display region of the array substrate 41. The other side of the second chip 53 is bonded to the other end of the fourth lead 55. In an embodiment, each of the first, second, third and fourth lead comprises a plurality of wires.

Hereafter, it will describe in detail a method for producing the narrow frame liquid crystal display according to the third embodiment. The method comprising steps of: forming a first mounting area on an array substrate 41 and a second mounting area at an edge of a surface of the array substrate 41 in the longitudinal direction (the second direction); mounting a color film substrate 42 on the first mounting area; arranging a first lead 46 on the second mounting area; bonding a first flexible circuit board 44 onto the second mounting area of the array substrate 41, for example, in a manner of press-fitting, so that the first flexible circuit board 44 is bonded to a first end of the first lead 46; and bonding a first side of a first chip 43 onto the second mounting area of the array substrate 41, for example, in a manner of press-fitting, so that the first chip 43 is bonded to a second end of the first lead 46. The first chip 43, the first lead 46 and the first flexible circuit board 44 are successively arranged on the second mounting area in the transversal direction (the first direction) away from the color film substrate 42. The distance between the first chip 43 and the first flexible circuit board 44 is set to be less than 10 mm.

In the above method for producing the narrow frame liquid crystal display, an end of a second lead 45 extending in the transversal direction is electrically connected to a display region of the array substrate 41 during the step of mounting the color film substrate 42 on the first mounting area; and a second side of the first chip 43 is bonded to the other end of the second lead 45 during the step of bonding the first side of the first chip 43 onto the second mounting area of the array substrate 41.

In another embodiment, in the above method for producing the narrow frame liquid crystal display, the first side of the first chip 43 is bonded to a side of the first flexible circuit board 44 connected to the first end of the first lead 46 during the step of bonding the first side of the first chip 43 onto the second mounting area of the array substrate 41. With such arrangement, the distance between the chip 43 and the first flexible circuit board 44 becomes zero, and the side of the first lead 46 connected to the first flexible circuit board 44 is fully bonded to the bottom of the first chip 43. As a result, the electrical connection of the first chip 43 to the first flexible circuit board 44 becomes more reliable, effectively avoiding the poor contact between the first chip 43 and the first flexible circuit board 44 with further reducing the length of the second mounting area on the surface of the array substrate 41 in the transversal direction.

The above method for producing the narrow frame liquid crystal display further comprising steps of: arranging a third lead 56 extending in the longitudinal direction on a third mounting area at an edge of the surface of the array substrate 41 extending in the transversal direction; bonding a second flexible circuit board 54 onto the third mounting area of the array substrate 41, so that the second flexible circuit board 54 is bonded to a first end of the third lead 56; and bonding a first side of a second chip 53 onto the third mounting area of the array substrate 41, so that the second chip 53 is bonded to a second end of the third lead 56. The second chip 53, the third lead 56 and the second flexible circuit board 54 are sequentially arranged in the longitudinal direction away from the color film substrate 42. A distance between the second chip 53 and the second flexible circuit board 54 is set to be less than 10 mm.

In the above method for producing the narrow frame liquid crystal display, an end of a fourth lead 55 is electrically connected to the display region of the array substrate 41 during the step of mounting the color film substrate 42 on the first mounting area; and a second side of the second chip 53 is bonded to the other end of the fourth lead 55 during the step of bonding the first side of the second chip 53 onto the third mounting area of the array substrate 41.

In another embodiment, in the above method for producing the narrow frame liquid crystal display, the first side of the second chip 53 is bonded to a side of the second flexible circuit board 54 connected to the first end of the third lead 56 during the step of bonding the first side of the second chip 53 onto the second mounting area of the array substrate 41. With such arrangement, the distance between the second chip 53 and the second flexible circuit board 54 becomes zero, and the side of the third lead 56 connected to the second flexible circuit board 54 is fully bonded to the bottom of the second chip 53. As a result, the electrical connection of the second chip 53 to the second flexible circuit board 54 becomes more reliable, effectively avoiding the poor contact between the second chip 53 and the second flexible circuit board 54 with further reducing the length of the third mounting area on the surface of the array substrate 41 in the longitudinal direction.

The narrow frame liquid crystal displays according to the above embodiments can be combined to a large screen liquid crystal display apparatus. Since each of the narrow frame liquid crystal displays constituting the large screen liquid crystal display apparatus has a narrow frame, the gap between two adjacent narrow frame liquid crystal displays is reduced, effectively improving the overall visual effect of the large screen liquid crystal display apparatus. Also, the large screen liquid crystal display apparatus may be combined by various narrow frame liquid crystal displays described in the above various embodiments.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle, so that more kinds of narrow frame liquid crystal display can be achieved with overcoming the technical problem of the present invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A narrow frame liquid crystal display, comprising:
   an array substrate comprising a first mounting area and a second mounting area;
   a color film substrate mounted on the first mounting area;
   a first chip bonded onto the second mounting area of the array substrate;
   a first flexible circuit board bonded onto the second mounting area of the array substrate;
   a plurality of first leads extending in a first direction away from the color film substrate on the second mounting area and configured to electrically connect the first chip and the first flexible circuit board; and
   a second lead configured to electrically connect a display region of the array substrate and the first chip,
   wherein the first chip and the first flexible circuit board are sequentially arranged on the second mounting area in the first direction away from the color film substrate, and
   wherein the first flexible circuit board is bonded to a first end of each first lead, the first chip is bonded to a second end of each first lead, adjacent side surfaces of the first flexible circuit board and the first chip in the first direction are in contact with each other, and each first lead is completely covered by the first chip and the first flexible circuit board.

2. The narrow frame liquid crystal display according to claim 1,
   wherein the first direction is a transversal direction or a longitudinal direction of a surface of the array substrate.

3. The narrow frame liquid crystal display according to claim 1,
   wherein the first flexible circuit board is bonded onto the second mounting area prior to the first chip.

4. The narrow frame liquid crystal display according to claim 3,
   wherein a length of the first flexible circuit board in a second direction perpendicular to the first direction is set to be less than or equal to a length of the first chip in the second direction.

5. The narrow frame liquid crystal display according to claim 4,
   wherein an end of the second lead provided on the array substrate in the first direction is electrically connected to the display region of the array substrate, and
   wherein a second side of the first chip is bonded to the other end of the second lead.

6. The narrow frame liquid crystal display according to claim 1, further comprising:
   a second chip, a third lead and a second flexible circuit board sequentially bonded onto a third mounting area of the array substrate in a second direction perpendicular to the first direction away from the color film substrate,
   wherein a distance between the second chip and the second flexible circuit board is set to be less than 10 mm.

7. The narrow frame liquid crystal display according to claim 6,
   wherein a first side of the second chip is bonded to a side of the second flexible circuit board connected to a first end of the third lead, and the second chip is bonded to a second end of the third lead.

8. The narrow frame liquid crystal display according to claim 6,
   wherein a length of the second flexible circuit board in the first direction is set to be less than or equal to a length of the second chip in the first direction.

9. The narrow frame liquid crystal display according to claim 7,
   wherein a fourth lead is arranged on the array substrate in the second direction,
   wherein an end of the fourth lead is electrically connected to the display region of the array substrate, and
   wherein a second side of the second chip is bonded to the other end of the fourth lead.

10. A large screen liquid crystal display apparatus combined by a plurality of narrow frame liquid crystal displays according to claim 1.

11. The large screen liquid crystal display apparatus according to claim 10,
    wherein the first flexible circuit board is bonded onto the second mounting area prior to the first chip.

12. The large screen liquid crystal display apparatus according to claim 1,
    wherein a first side of the first chip is bonded to a side of the first flexible circuit board connected to a first end of each first lead, and the first chip is bonded to a second end of each first lead.

13. The large screen liquid crystal display apparatus according to claim 10, further comprising:

a second chip, a third lead and a second flexible circuit board sequentially bonded onto a third mounting area of the array substrate in a second direction perpendicular to the first direction away from the color film substrate, wherein a distance between the second chip and the second flexible circuit board is set to be less than 10 mm.

14. The large screen liquid crystal display apparatus according to claim 13, wherein a first side of the second chip is bonded to a side of the second flexible circuit board connected to a first end of the third lead, and the second chip is bonded to a second end of the third lead.

15. A method for producing a narrow frame liquid crystal display, comprising steps of:

forming a first mounting area and a second mounting area on an array substrate;

mounting a color film substrate on the first mounting area;

arranging a plurality of first leads in a first direction away from the color film substrate on the second mounting area;

bonding a first flexible circuit board onto the second mounting area of the array substrate, so that the first flexible circuit board is bonded to a first end of each first lead; and bonding a first chip onto the second mounting area of the array substrate, so that the first chip is bonded to a second end of each first lead, wherein the first chip and the first flexible circuit board are sequentially arranged on the second mounting area in a first direction away from the color film substrate, and wherein adjacent side surfaces of the first flexible circuit board and the first chip in the first direction are in contact with each other during the step of bonding the first chip onto the second mounting area of the array substrate, and each first lead is completely covered by the first chip and the first flexible circuit board.

16. The method according to claim 15, wherein an end of a second lead extending in the first direction is electrically connected to a display region of the array substrate during the step of mounting the color film substrate on the first mounting area; and wherein a second side of the first chip is bonded to the other end of the second lead during the step of bonding the first chip onto the second mounting area of the array substrate.

17. The method according to claim 15, further comprising steps of:

arranging a third lead extending in a second direction perpendicular to the first direction on a third mounting area of the array substrate;

bonding a second flexible circuit board onto the third mounting area of the array substrate, so that the second flexible circuit board is bonded to a first end of the third lead; and bonding a second chip onto the third mounting area of the array substrate, so that the second chip is bonded to a second end of the third lead, wherein the second chip, the third lead and the second flexible circuit board are sequentially arranged in the second direction away from the color film substrate, and wherein a distance between the second chip and the second flexible circuit board is set to be less than 10 mm.

18. The method according to claim 17, wherein an end of a fourth lead extending in the second direction is electrically connected to the display region of the array substrate during the step of mounting the color film substrate on the first mounting area; and wherein a second side of the second chip is bonded to the other end of the fourth lead during the step of bonding the second chip onto the third mounting area of the array substrate.

* * * * *